United States Patent Office 3,012,026
Patented Dec. 5, 1961

3,012,026
PROCESSES OF PREPARING STEROID 7,11-DIOLS
Arthur E. Erickson, Cranford, N.J., assignor to Merck & Co., Inc., Rahway, N.J., a corporation of New Jersey
No Drawing. Continuation of application Ser. No. 362,137, June 16, 1953. This application Nov. 15, 1956, Ser. No. 622,234
9 Claims. (Cl. 260—239.55)

This invention relates to a novel process for preparing allo - cyclopentanopolyhydrophenanthrene compounds. More particularly, this invention deals with a novel method of converting the epoxides of $\Delta^{7,9(11)}$-allo-cyclopentanopolyhydrophenanthrene compounds into their corresponding $\Delta^{8(9)}$-7,11-dihydroxy compounds.

This application is a continuation of our copending application Serial No. 362,137, filed June 16, 1953, now abandoned.

The process involved herein may be chemically represented, insofar as the changes taking place in rings B and C are concerned, as follows:

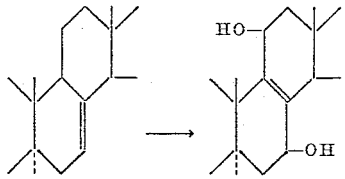

The conversion of epoxides of $\Delta^{7,9(11)}$-steroids to the corresponding $\Delta^{8}$-7,11-dihydroxy-steroid has been accomplished by treating the epoxide, in dioxane, with dilute aqueous sulfuric acid. This procedure has, however, been difficult to carry out in view of the fact that the reaction time (3 minutes) is very critical, and the mixture must be neutralized as soon as the reaction is over to prevent further rearrangement of the $\Delta^{8}$-7,11-dihydroxy-steroid product. Moreover, this aqueous mineral acid hydrolysis procedure requires prohibitive volumes of expensive organic solvents (dioxane), and would therefore be extremely costly in the commercial production of $\Delta^{8}$-7,11-dihydroxy-steroid compounds.

I have now discovered an improved method which eliminates the critical time factor and large volume of organic solvent, necessitated by this mineral acid hydrolysis procedure. In this improved method, the $\Delta^{7}$-9,11-epoxy - allo - cyclopentanopolyhydrophenanthrene compound is treated, preferably at elevated temperature, as for example under reflux at atmospheric pressure, with a catalytic amount of an organic acid in low concentration, in the presence of water and an inert organic solvent. The time required in this improved method, from about one to twenty-four hours depending on the organic acid catalyst employed, is not critical and is well-adapted to commercial operation; the amounts of organic solvent used as a liquid medium is about one-tenth to one-twentieth that employed in the mineral acid process.

As stated above, my process is applicable to the rearrangement of epoxides of $\Delta^{7,9(11)}$-allo-cyclopentanopolyhydrophenanthrenes in general. The nature of the substituents on rings A and D does not materially effect the operability of the present process. Thus, the process can be satisfactorily conducted with epoxides containing free hydroxyl groups in rings A and D, although, preferably, such groups particularly those at the 3-position, can be blocked, e.g., by esterification prior to subjecting the materials to the present rearrangement process. Also, it may be noted specifically that the nature of the side chain on the C-17 carbon atom does not materially affect the present reaction.

The $\Delta^{7}$-9,11-epoxy-allo-cyclopentanopolyhydrophenanthrene compounds which we ordinarily employ as starting materials in carrying out the presently invented process are those having a sterol side chain attached to the carbon atom in the 17-position of the molecule such as ergosterol D-acetate epoxide, $\Delta^{7,22}$-9,11-epoxy-ergostadiene, $\Delta^{7,22}$-3-acyloxy-9,11-epoxy-ergostadiene, $\Delta^{7}$-9,11 - epoxy-cholestene, $\Delta^{7}$-3-acyloxy-9,11-epoxy-cholestene, $\Delta^{7}$-3-acetoxy-9,11-epoxy-cholestene, $\Delta^{7,22}$-3-acyloxy-9,11-epoxy-stigmastadiene, $\Delta^{7,22}$-3-acetoxy-9,11-epoxy-stigmastadiene, a bile acid side chain attached to the 17-carbon atom such as $\Delta^{7}$-3-acyloxy-9,11-epoxy-allocholenic acid, $\Delta^{7}$-3-acetoxy-9,11-epoxy-allocholenic acid, and alkyl esters thereof, a degraded bile acid side chain attached to the 17-carbon atom such as $\Delta^{7}$-3-acyloxy-9,11-epoxy-bisnorallocholenic acid, $\Delta^{7}$-3-acetoxy-9,11-epoxy-bisnorallocholenic acid, and alkyl esters thereof, a 17-acetyl substituent such as $\Delta^{7}$-3-acyloxy-9,11-epoxy-20-keto-allopregnene, $\Delta^{7}$-3 - acetoxy-9,11-epoxy-20-keto-allopregnene, a sapogenin side chain such as $\Delta^{7}$-9,11-epoxy-dehydrotigogenin acylate, $\Delta^{7}$-3-acetoxy-9,11-epoxy-dehydrotigogenin, and the like.

These $\Delta^{7}$-9,11-epoxy-allo-cyclopentanopolyhydrophenanthrene compounds, utilized as starting materials in my process are conveniently prepared in accordance with procedures described in J.A.C.S. 73, 2396 (1951). I ordinarily start with readily available $\Delta^{7,9(11)}$-cyclopentanopolyhydrophenanthrene compounds such as ergosterol-D and 3-acyloxy derivatives thereof; other $\Delta^{7,9(11)}$-allo-cyclopentanopolyhydrophenanthrene compounds are also easily prepared, starting with readily available $\Delta^{5}$-cyclopentanopolyhydrophenanthrene compounds such as cholesterol, by treating said $\Delta^{5}$-cyclopentanopolyhydrophenanthrene compound with N-bromosuccinimide, reacting the resulting $\Delta^{5}$-7-bromocyclopentanopolyhydrophenanthrene compound with a tertiary amine to form the corresponding $\Delta^{5,7}$ - cyclopentanopolyhydrophenanthrene compound, reacting this compound with hydrogen in the presence of Raney nickel catalyst thereby selectively reducing the unsaturated linkage attached to the carbon atom in the 5-position to form the corresponding $\Delta^{7}$-cyclopentanopolyhydrophenanthrene compound and bringing said $\Delta^{7}$-cyclopentanopolyhydrophenanthrene compound into intimate contact with a solution of mercuric acetate in acetic acid thereby producing the corresponding $\Delta^{7,9(11)}$ - cyclopentanopolyhydrophenanthrene compound. The $\Delta^{7,9(11)}$-cyclopentanopolyhydrophenanthrene compound is then converted to the corresponding epoxide by reaction with perbenzoic acid thus forming the corresponding $\Delta^{7}$-9,11 - epoxy-cyclopentanopolyhydrophenanthrene compound (Compound 1 hereinabove).

The herein-described rearrangement reaction between the epoxides set forth specifically above results in the formation of the corresponding $\Delta^{8(9)}$-7,11-dihydroxy-allocyclopentanopolyhydrophenanthrenes; as for example $\Delta^{8(9),22}$-3-acyloxy-7,11-dihydroxy-ergostadiene; $\Delta^{8(9),22}$-3-acetoxy-7,11-dihydroxy-ergostadiene; $\Delta^{8(9)}$-3-acyloxy-7,11-dihydroxy-cholestene; $\Delta^{8(9)}$ - 3 - acetoxy - 7,11-dihydroxy-cholestene; $\Delta^{8(9),22}$-3-acyloxy-7,11-dihydroxy-stigmastadiene; $\Delta^{8(9),22}$ - 3 - acetoxy - 7,11-dihydroxy-stigmastadiene; $\Delta^{8(9)}$-3-acyloxy-7,11-dihydroxy-allocholenic acid; $\Delta^{8(9)}$-3-acetoxy-7,11-dihydroxy-allocholenic acid; $\Delta^{8(9)}$-3-acyloxy-7,11-dihydroxy-bisnorallocholenic acid; $\Delta^{8(9)}$-3 - acetoxy-7,11-dihydroxy-bisnorallocholenic acid; $\Delta^{8(9)}$-3-acyloxy-7,11-1dihydroxy-20-keto-allopregnene; $\Delta^{8(9)}$-3-acetoxy-7,11-dihydroxy-20-keto-allopregnene;$\Delta^{8(9)}$-3-acyloxy - 7,11 - dihydroxy-dehydrotigogenin; $\Delta^{8(9)}$- 3 - acetoxy - 7,11 - dihydroxy-dehydrotigogenin; and the like.

Among the acids I have found to give satisfactory results in my process I may mention: formic acid, monochloroacetic acid, acetic acid, glycolic acid, benzoic acid, bromoacetic acid, bromopropionic acid, citric acid, naphthoic acid, salicylic acid, succinic acid and tartaric acid. Organic acids having an ionization constant within the range between $1.5 \times 10^{-5}$ and $1.5 \times 10^{-3}$, in water at 20° C. can be employed with advantageous results.

The concentration of the organic acid employed may be varied over narrow limits. I prefer to use from 0.1% to 0.3% of acid, based on the volume of the contents of the reaction mixture, but up to about 1% of the organic acid may be used if desired. Substantially smaller concentrations are not recommended because of the greatly-increased reaction period. The use of substantially higher concentrations results in the further rearrangement of the desired dihydroxy compounds to ketones and, therefore, should be avoided.

While the amount of water employed may be varied over wide limits, I have found that amounts between about 20% and 50% by volume give advantageous results, as the steroid remains in solution and the reaction proceeds at a satisfactory rate.

The solvent employed herein should be inert under the conditions of the reaction, and it should be a solvent for the starting materials. Additionally, the solvent should be one in which water is soluble, as an appreciable volume of the reaction mixture may be aqueous, as noted above. I have found that oxygenated solvents give satisfactory results, dioxane and acetone being noteworthy in this regard. Alcohols such as methyl and ethyl alcohol can be used but are not especially desirable as the steroids have limited solubility therein.

The time of reaction depends on the materials employed. From 1 to 6 hours has been found sufficient when formic or chloroacetic acid in dioxane are employed, with 3 to 5 hours usually giving the desired results. Longer reaction times are necessary with weaker acids such as acetic acid, 15 to 24 hours being required in this case to obtain the desired result.

When employing low boiling solvents such as acetone, the reaction time will accordingly be longer than when a higher boiling solvent is employed under reflux conditions.

In order to prevent undesirable oxidative changes in the dihydroxy compounds formed, the herein-described process may advantageously be conducted under conditions where the reactants are substantially protected from exposure to oxygen as in a closed vessel and/or under an inert atmosphere.

The following examples illustrate the method of carrying out the present invention, but it is to be understood that these examples are for purposes of illustration and not of limitation.

*Example 1*

One gram of Ergosterol-D epoxide was dissolved in 40 cc. of dioxane and 10 cc. of water containing 0.2 cc. of 88% formic acid. The solution was refluxed for five hours in a nitrogen atmosphere, and then cooled to about 5° C. The resulting precipitate of $\Delta^{8(9),22}$-3,7,11-trihydroxy ergostadiene was removed by filtration. The precipitate, after drying, melting at 253°–260° C. Trituration of the solid with chloroform and recrystallization from methyl alcohol gave a pure product melting at 267°–269° C.

*Example 2*

One gram of Ergosterol-D acetate epoxide was dissolved in 40 cc. of dioxane and 10 cc. of water containing 0.1 cc. of 88% formic acid. The solution was refluxed for three hours in a nitrogen atmosphere. On cooling the contents of the reaction chamber to about 5° C, crude $\Delta^{8(9),22}$-3-acetoxy-7,11-dihydroxy-ergostadiene precipitated. After subjecting the crude to chromatography on alumina and elution with acetone, the product, M.P. 241°–243° C., was obtained in pure form.

*Example 3*

A solution of 2 grams of Ergosterol-D epoxide in 80 cc. of dioxane and 20 cc. of water containing 0.4 cc. of glacial acetic acid was heated at reflux temperature for about twenty-four hours. On cooling the reaction mixture to about 5° C. crude 3,7,11 trihydroxy-$\Delta^{8(9),22}$-ergostadiene precipitated. The solid was filtered and washed free of acid. Trituration with chloroform and recrystallization from methanol yielded purified $\Delta^{8(9),22}$-3,7,11-trihydroxy-ergostadiene, M.P. 263°–270° C.

*Example 4*

To a solution of 40 cc. of dioxane and 10 cc. of water containing 0.1 g. of monochloroacetic acid was added 1.0 g. of Ergosterol-D-acetate epoxide. The resulting solution was refluxed for about two and a half hours, under nitrogen. The reaction mixture was then cooled to about 5° C., and the solid filtered, washed with water and dried. A second crop of crude product was obtained by diluting the filtrate with about 200 cc. of water. The combined dried crudes were triturated with 8 cc. of benzene, and the mixture filtered to yield purified, $\Delta^{8(9),22}$-3-acetoxy-7,11-dihydroxy-ergostadiene.

Various changes and modifications may be made in carrying out the present invention without departing from the spirit and scope thereof. Insofar as these changes and modifications are within the purview of the annexed claims, they are to be considered as part of my invention.

I claim:

1. The process for the preparation of $\Delta^{8(9)}$-7,11-dihydroxy - allo - cyclopentanopolyhydrophenanthrene compounds which comprises reacting an aqueous solution of an acidic hydrolyzing agent at reflux temperature with an epoxide of a $\Delta^{7,9(11)}$-allocyclopentanopolyhydrophenanthrene, selected from the group which consists of $\Delta^7$-steroid 9,11-epoxides of the following series: the erogosterol series and the sapogenin series, said acidic hydrolyzing agent consisting solely of an organic acid having an ionization constant within the range from about $1.5 \times 10^{-5}$ to $1.5 \times 10^{-3}$.

2. The process of claim 1, in which the organic acid is acetic acid.

3. The process of claim 1, in which the organic acid is monochloroacetic acid.

4. The process for the preparation of $\Delta^{8(9)}$-7,11-dihydroxy - allo - cyclopentanopolyhydrophenanthrene compounds which comprises reacting an aqueous solution of formic acid at reflux temperature with an epoxide of a $\Delta^{7,9(11)}$-allo-cyclopentanopolyhydrophenanthrene, selected from the group which consists of $\Delta^7$-steroid 9,11-epoxides of the following series: the ergosterol series and the sapogenin series.

5. The process for the preparation of $\Delta^{8(9)}$-7,11-dihydroxy - allo - cyclopentanopolyhydrophenanthrene compounds which comprises reacting at reflux temperature an aqueous dioxane solution containing between 0.1% to 0.3% by volume of formic acid with an epoxide of a $\Delta^{7,9(11)}$-allo-cyclopentanopolyhydrophenanthrene, selected from the group which consists of $\Delta^7$-steroid 9,11-epoxides of the following series: the ergosterol series and the sapogenin series.

6. The process for preparing $\Delta^{8(9),22}$-3-acetoxy-7,11-dihydroxy ergostadiene, which comprises reacting $\Delta^{7,22}$-3-acetoxy-ergostadiene 9,11-epoxide with an aqueous solution of an acidic hydrolyzing agent consisting solely of an organic acid having an ionization constant within the range from about $1.5 \times 10^{-5}$ to $1.5 \times 10^{-3}$, said reaction being carried out at approximately reflux temperature.

7. The process for preparing $\Delta^{8(9),22}$-3-acetoxy-7,11-dihydroxy ergostadiene, which comprises reacting $\Delta^{7,22}$-3-acetoxy-ergostadiene 9,11-epoxide with an aqueous solution of dioxane and containing 0.1% to 0.3% by volume of formic acid, said reaction being conducted at approximately reflux temperature.

8. The process for preparing $\Delta^{8(9),22}$-3,7,11-trihydroxy-ergostadiene, which comprises reacting $\Delta^{7,22}$-3-hydroxy-ergostadiene 9,11-epoxide with an aqueous solution of an acidic hydrolyzing agent consisting solely of an organic acid having an ionization constant within the range from about $1.5 \times 10^{-5}$ to $1.5 \times 10^{-3}$, said reaction being carried out at approximately reflux temperature.

9. The process for preparing $\Delta^{8(9),22}$-3,-7,11-trihydroxy-ergostadiene, which comprises reacting $\Delta^{7,22}$-3-hydroxy-ergostadiene 9,11-epoxide with an aqueous dioxane solution containing between 0.1% to 0.3% by volume of formic acid, said reaction being carried out at approximately reflux temperature.

References Cited in the file of this patent

UNITED STATES PATENTS 2,768,188    Ruzicka et al.   ---------- Oct. 23, 1956

FOREIGN PATENTS 507,987    Belgium ---------------- June 21, 1952